Nov. 8, 1960

L. O. REICHELT ET AL 2,958,994

CRADLE POSITIONING AND LOCKING MECHANISM
FOR CABLE-STRANDING APPARATUS

Filed July 10, 1959

INVENTORS
L.O. REICHELT
D.V. WATERS
BY A.C. Schwarz, Jr.
ATTORNEY

FIG. 8

INVENTORS
L.O. REICHELT
D.V. WATERS

Nov. 8, 1960  L. O. REICHELT ET AL  2,958,994
CRADLE POSITIONING AND LOCKING MECHANISM
FOR CABLE-STRANDING APPARATUS
Filed July 10, 1959  6 Sheets-Sheet 6

FIG. 9

INVENTORS
L.O. REICHELT
D.V. WATERS
BY
a.C. Schwarz Jr.
ATTORNEY

United States Patent Office 2,958,994
Patented Nov. 8, 1960

2,958,994

CRADLE POSITIONING AND LOCKING MECHANISM FOR CABLE-STRANDING APPARATUS

Lester O. Reichelt, Downers Grove, Ill., and Daniel V. Waters, Lebanon, N.J., assignors, by direct and mesne assignments, to Western Electric Company, Incorporated, New York, N.Y., a corporation of New York Filed July 10, 1959, Ser. No. 826,222

14 Claims. (Cl. 57—54)

This invention relates to cradle positioning and locking mechanism for cable-stranding apparatus and more particularly to cable-stranding apparatus having a rotatable cradle for supporting a cable take-up reel and having mechanism for stopping, aligning and locking the cradle in a predetermined loading position and for subsequently connecting a source of electric power thereto.

In one type of cable-stranding apparatus, the cable is wound on a reel which is mounted on a cradle that is supported for rotation about a horizontal axis to impart a twist to the cable. After a predetermined length of the cable has been wound onto the reel, the apparatus is stopped and the cradle may come to rest in any position. It is then necessary to turn the cradle to a predetermined loading position with the reel disposed in a vertical position to facilitate the removal of a loaded reel from the apparatus and the loading of an empty reel thereonto.

An object of the present invention is to provide an improved cradle positioning and locking mechanism for cable-stranding apparatus.

Another object of the invention is the provision in a cable-stranding apparatus having a rotatable cradle for supporting a cable take-up reel of improved mechanisms for stopping and aligning the cradle in a predetermined position to permit the loading and unloading of the reel.

A further object of the invention is the provision in a cable-stranding apparatus of facilities engageable with the cradle for locking and supporting the cradle against turning movement while a reel is being moved onto or removed therefrom.

A further object of the invention resides in the provision of mechanism for automatically connecting a power plug to the cradle when it is stopped in a loading position to supply electrical power to mechanisms carried therein.

An apparatus illustrating certain aspects of the invention may include a rotatable cradle for supporting a reel on which the cable is wound, a variable drive for effecting the rotation of the cradle at a normal operating speed and a slow speed, a brake for stopping the rotation of the cradle, and a cradle-positioning mechanism for turning the cradle from any of the positions in which it may stop to a predetermined loading position with the reel disposed vertically to permit the removal of the full reel.

With a full reel ready for removal from the cradle, a selector switch of the cradle-positioning mechanism manually is set to a predetermined position to cause the cradle to rotate at the slow speed and to cause a control member to be advanced toward the cradle and be actuated by a cam thereon to effect the operation of the brake to stop the cradle in a position of "approach" within a predetermined angular distance of the loading position. A feeler member is then advanced toward the cradle and is actuated by a projecting abutment thereon only when the cradle has been stopped in said position of "approach" to effect the actuation of a positioning plunger to engage a centering recess in the cradle and turn the cradle to locate it in its loading position.

A pair of spuds are then moved into engagement with shoulders on the cradle to lock the cradle against turning movement and to support it during the movement of the reel therefrom. Means are also provided for automatically moving a power plug connected to an external source of power into engagement with a receptacle on the cradle to connect the power supply to electrical mechanisms within the cradle.

Other objects and advantages of the invention will become apparent by reference to the following detailed description of the invention and the accompanying drawings wherein.

Figure 1:
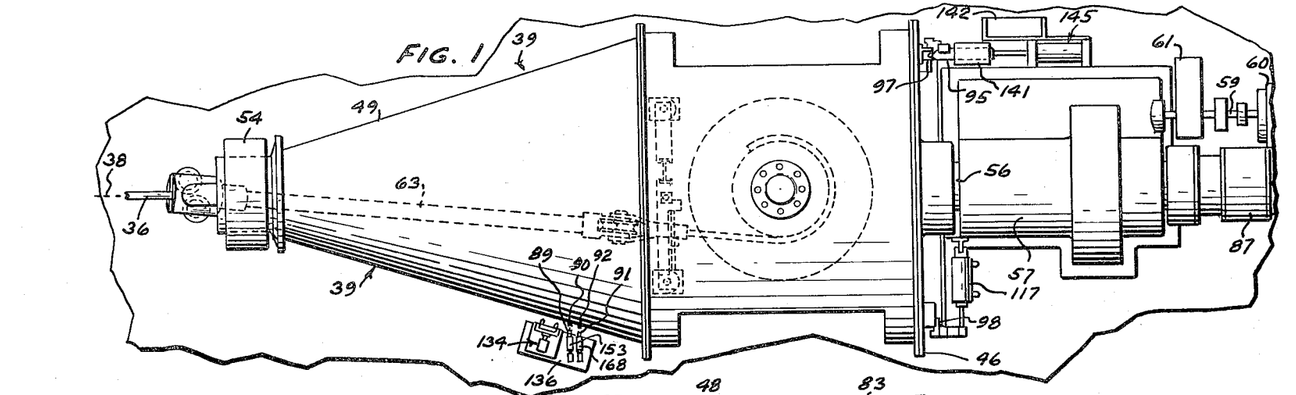
Figs. 1 and 2 are plan and side elevational views, respectively, of a portion of a cable-stranding apparatus.

In the present apparatus, a cable 36 (Figs. 1 and 2) is formed from a plurality of insulated conductors along a substantially horizontal axis 38 and is drawn into a cradle 39 and wound onto a take-up reel 40. The reel 40 is supported in the cradle 39 for rotation about the reel axis 41 to wind the cable thereon and for turning movement with the cradle about the horizontal axis 38 to twist the cable.

The cradle 39 is a hollow structural shell having a pair of circular vertically disposed walls 45, 46 and a pair of horizontal parallel frame members 47, 48 extending between the walls 45, 46 for receiving the reel 40 therebetween and forming a pair of side openings in the cradle 39 whereby the reel may be loaded thereonto and unloaded therefrom from either side of the cradle. The lower frame member 47 forms a platform on which the reel is supported when the cradle is in a loading position. A tapering end portion 49 extends from the plate 45 and has a hollow journal 53 secured thereto which is rotatably supported in a bearing block 54 mounted on a base 55. A hollow journal 56 fixed to the vertical plate 46 of the cradle is rotatably supported in a pedestal 57 on the base 55 and is connected through a train of gears 58 and a drive shaft 59 to a motor 60 by means of which the cradle 39 and the cable take-up reel 40 are rotated about the horizontal axis 38. A brake 61 is provided on the shaft 59 to stop the rotation of the cradle 39.

The base 55 has a pit formed therein for receiving a portion of the cradle 39, the upper surface of the base being substantially flush with the upper surface of the platform 47 of the cradle when the cradle is in its loading position to permit the loading of an empty reel 40 onto the cradle and the removal of a full reel therefrom. As the cable 36 moves into the cradle 39 (Fig. 2), it enters and is guided in a movable composite guide tube 63 which is swivelly connected at one end to the hollow trunnion 53 and is pivotally connected at its other end to a distributing member 64 of a cable-distributing mechanism 65 for guiding the cable evenly onto the reel 40 in successive layers. The cable-guiding mechanism including the composite guide tube 63 is disclosed more fully in co-pending application Serial No. 826,225, filed July 10, 1959.

Figure 2:
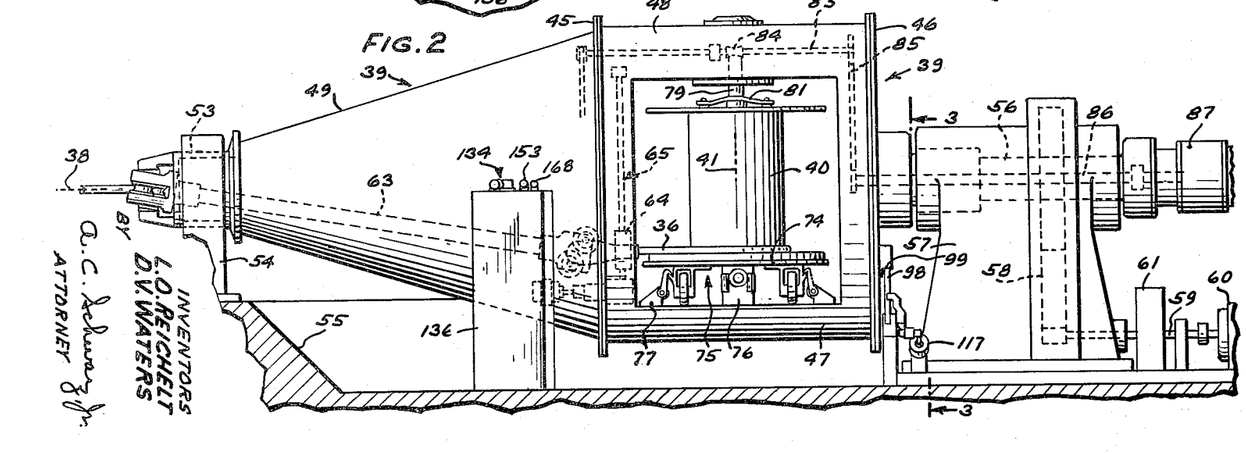

The reel 40 is rotatably and permanently mounted on a mobile truck 74 which cooperates with the reel to form a reel and mobile reel-truck unit 75. When the reel and reel-truck unit is in the cradle 39, the reel 40 and the truck 74 are supported on a supporting and positioning block 76 fixed to the platform 47 of the cradle 39 and the truck 74 is releasably clamped to the platform 47 of the cradle 39 by a reel-truck clamping mechanism 77 (Fig. 2).

The upper end of the reel 40 is engageable with a reel centering and clamping shaft 79 of a reel-clamping mechanism (not shown) for clamping the reel against the supporting block 76 to center and support the reel for rotation. The shaft 79 has a cross arm 81 which establishes a driving connection with the reel 40 and this shaft is rotated by a reel-driving mechanism which includes a drive shaft 83 and gearing 84 interconnecting the shafts. The shaft 83 is connected through a chain and sprocket connection 85 to a drive shaft 86 which is rotatably supported in and extends through the hollow journal 56 and is connected to a motor 87. The housing of the motor 87 is fixedly secured to the hollow trunnion 56 for rotation with the cradle 39. The shaft 83 also drives the cable-distributing mechanism 65. The reel clamping and the truck-clamping mechanism are more fully disclosed in co-pending application Serial No. 826,224, filed July 10, 1959.

After a predetermined length of the cable 36 has been wound onto the reel 40 and the cradle 39 is stopped, the cradle may come to rest in any angular position about its axis and the cradle has to be relocated angularly about its axis to a predetermined "loading" position with the reel 40 disposed vertically and the platform 47 disposed horizontally so that the reel and reel-truck unit may be removed from the cradle.

Figure 4:
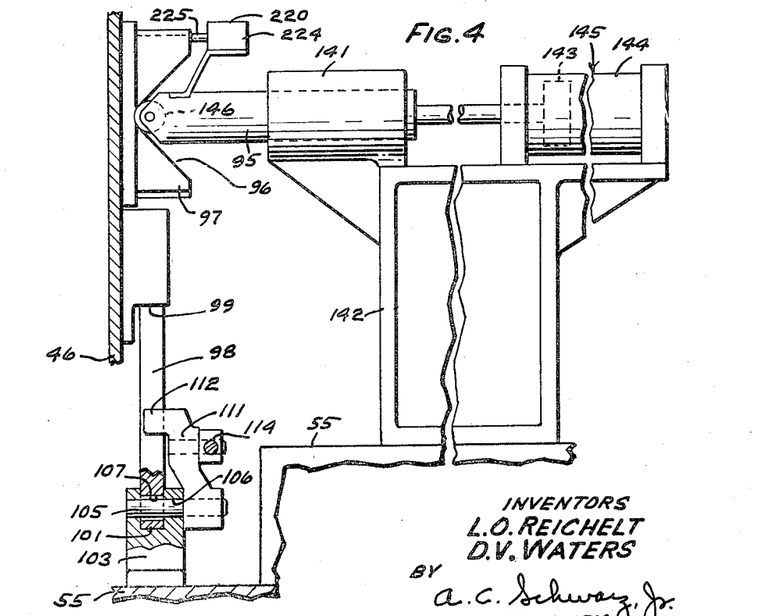
Fig. 4 is a fragmentary vertical sectional view of the apparatus taken along line 4—4 of Fig. 3 and showing the cradle-positioning mechanism and the cradle-locking mechanism.
Figure 7:
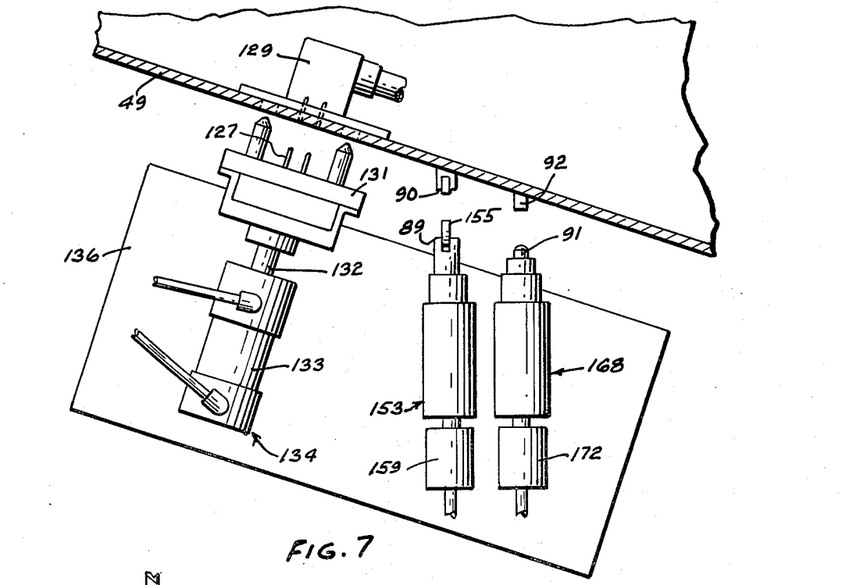
Fig. 7 is an enlarged fragmentary plan view of the apparatus showing a portion of the cradle-aligning mechanism and the power plug inserting mechanism.

To accomplish this, a cradle-positioning mechanism is provided and the operation of this mechanism is initiated by manually setting a selector switch 88 (Fig. 8) to effect the release of the brake 61, the slow rotation of the cradle 39, and the movement of a control element 89 (Figs. 1, 7 and 8) into the path of movement of a cam 90 on the periphery of the cradle for actuation thereby to effect the actuation of the brake 61 to stop the cradle 39 in a position of "approach" within a predetermined angular distance of the "loading" position. The cradle-positioning mechanism also effects the actuation of a sensing means including a feeler member 91 which is actuated by a projecting abutment 92 if the cradle 39 has stopped in the "approach" position, and which serves to effect the actuation of a positioning plunger 95 (Figs. 1, 4 and 8a) into a V-shaped recess 96 in a block 97 on the cradle 39 to bring the cradle 39 into dead center at the "loading" position.

Figure 3:
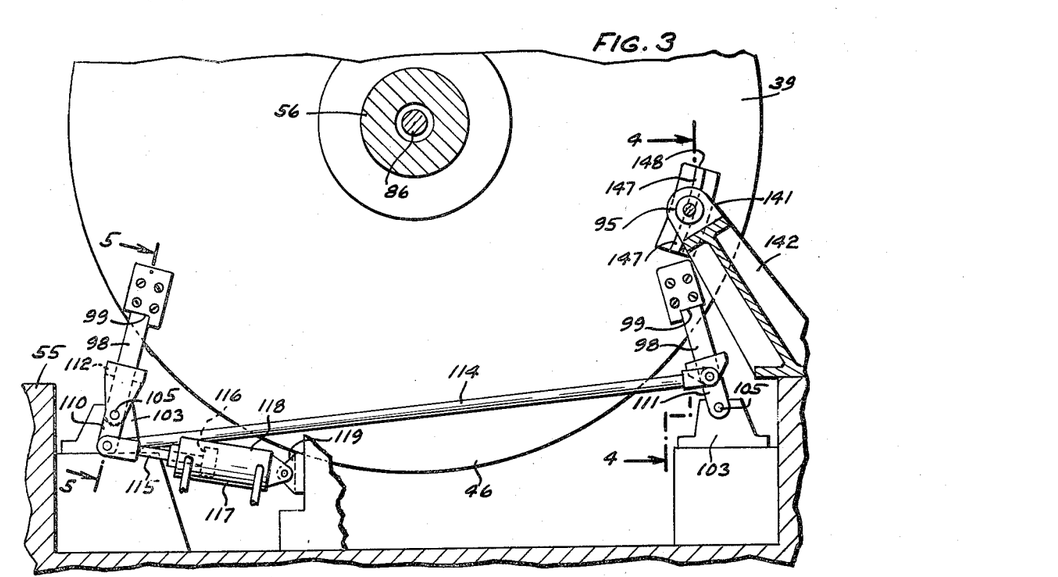
Fig. 3 is an enlarged vertical cross sectional view of the apparatus taken along line 3—3 of Fig. 2 and showing a portion of the cradle-postioning mechanism and the cradle-locking mechanism.

In response to movement of the cradle 39 into the "loading" position, a cradle-locking mechanism is actuated to move a pair of spuds 98 (Figs. 2, 3 and 8a) pivotally mounted on the base on opposite sides of the cradle, into engagement with abutments or shoulders 99 on the cradle 39 to lock the cradle 39 against rotation in either direction and to take the load off of the cradle-drive mechanism during the loading and unloading of the reel and reel-truck unit 75.

Figures 5, 6:
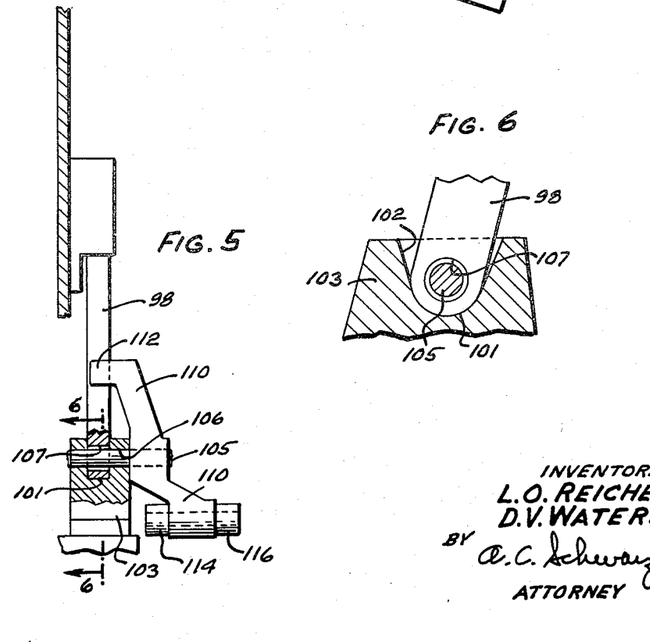
Fig. 5 is a fragmentary vertical sectional view through the apparatus taken along line 5—5 of Fig. 3 showing a portion of the cradle-locking mechanism.
Fig. 6 is a fragmentary vertical sectional view through a portion of the cradle-locking mechanism taken along line 6—6 of Fig. 5.

The lower ends of the spuds 98 have cylindrical end surfaces 101 and (Figs. 3–6) are disposed in recesses 102 formed in brackets 103 fixed to the base 55 of the apparatus. The recesses 102 permit pivotal movement of the spuds 98 to and from operative and inoperative positions engaged with and disengaged from the abutments 99, respectively, and the brackets 103 have cylindrical surfaces in the recesses 102 conforming to and engaging the lower ends of the spuds 98 for supporting the spuds and receiving the thrust applied thereto by the cradle 39 during the loading and unloading of the reel and reel-truck unit 75 onto and from the cradle 39. Pins 105 snuggly fitting in coaxially aligned apertures 106, 106 (Figs. 4 and 5) in the brackets 103 and loosely in larger apertures 107 in the spuds 98, respectively, retain the spuds against vertical displacement.

Actuating arms 110 and 111 pivotally supported on and extending upwardly from the pins 105 have laterally disposed lugs 112 at their upper ends engageable with opposite sides of the spuds 98 to effect a connection therewith for imparting oscillatory movement thereto. The arm 110 has a portion extending downwardly below the pin 105 and a link 114 is connected thereto and to the arm 111 for tying the arms 110 and 111 and the spuds 98 together for simultaneous actuation in opposite directions. Also connected to the lower end of the arm 110 is a piston rod of a piston 116 reciprocable in a cylinder 117 of a fluid-operated actuator 118 which is pivotally connected to a bracket 119 on the base 55. Actuation of the spuds 98 to and from their operative positions is effected by the flowing of compressed air into opposite ends of the cylinder 117 under control of a valve 120 (Fig. 8a) which is shifted to and from first and second positions by a pair of solenoids 121 and 122.

After the cradle 39 has been locked in loading position, a movable power plug 127 (Fig. 8a) connected to power lines 195 is automatically inserted into a cooperable receptacle 129 which is mounted on the tapering portion 49 of the cradle 39 (Figs. 1 and 2) for supplying power to power-driven mechanisms on the cradle 39 such as the motors 130 and 130a (Fig. 8a) of the reel clamping and the reel-truck clamping mechanisms. The power plug 127 is mounted on a head 131 (Figs. 7 and 8a) which is carried by a piston 132 reciprocable in a cylinder 133 of a fluid-operated actuator 134. This actuator 134 is supported in fixed position adjacent the cradle 39 on a pedestal 136 on the base 55. The piston 132 is power actuated in both directions by the flow of compressed air to opposite ends of the cylinder 133 under control of a valve 137 (Fig. 8a) to move the power plug 127 to an advanced position in engagement with the receptacle 129 and also to remove the power plug therefrom. The valve 137 is spring stressed to one position and is actuated to its other position by a solenoid 138.

Returning now to the cradle-positioning mechanism, (Figs. 3 and 4) the cradle-positioning plunger 95 is slidably mounted for longitudinal movement in a guide 141 formed on a supporting bracket 142 fixed to the base 55. The plunger is connected to a piston 143 reciprocable in a cylinder 144 of a fluid-operated actuator 145 which is secured to the bracket 142. At its forward end, the plunger 95 carries a roller 146 which is adapted to engage the diverging cam surfaces of the V-shaped centering recess 96 in the block 97 on the cradle 39 and to seat in the bottom of the recess to accurately locate the cradle angularly about its axis in its predetermined "loading" position. Reciprocation of the plunger 95 into and out of the centering recess 96 is imparted by the actuator 145 in response to admission of compressed air to opposite ends thereof under control of a valve 149 which is shifted from one position to another by a pair of solenoids 150 and 151.

The control member 89 (Figs. 1, 7 and 8) of the cradle-positioning mechanism is in the form of a plunger slidably supported on a carrier 153 for actuating a normally open switch 154 on the carrier. The control member 89 is spring urged to a normal forward position and carries a roller 155 at its forward end. The carrier 153 is mounted on a piston rod 156 of a piston 157 reciprocable in a cylinder 158 of a fluid-operated actuator 159 mounted on the pedestal 136. The piston is spring urged in one direction to return the carrier 153 to a normal retracted position and the piston 157 is moved in the opposite direction by compressed air admitted to the cylinder under control of a valve 160 to advance the carrier 153 to a forward position to locate the roller 155 on the plunger 89 in close proximity to the cradle 39 and in the path of the cam 90 on the periphery of the cradle. In response to actuation by the cam 90, the plunger 89 closes the switch 154. The valve 160 is spring urged to a normal closed position and is actuated to an open position by a solenoid 162 in response to energization thereof.

In like manner, the feeler member 91 is in the form of a plunger slidably mounted on a carrier 168 for actuating a normally open switch 169 also mounted thereon. The carrier 168 is attached to a piston 170 slidably mounted in a cylinder 171 of a fluid-operated actuator 172 which is mounted adjacent the fluid-operated actuator 159 on the pedestal 136. This piston 170 is spring urged in one direction to return the carrier 168 and the feeler member 91 to a normal retracted position and the piston 170 is moved forward a predetermined distance by compressed air under control of a valve 174 to advance the carrier 172 and the feeler member 91 to a predetermined forward position adjacent the cradle 39. The valve 174 is spring stressed to a normal "off" position and is shifted to "open" position by a solenoid 175 in response to energization thereof.

As the carrier 168 moves to its advanced position and when the cradle 39 is in its position of "approach," the projecting abutment 92 on the periphery of the cradle will intercept the feeler member 91 and arrest its movement as the carrier 168 continues its movement to its advanced position, and the relative movement between the feeler member 91 and the carrier 168 serves to close the switch 169. When the cradle 39 is not stopped in its "approach" position, the abutment 92 is not in the path of the feeler member 91 and does not arrest its movement during the movement of the carrier 168 to its advanced position and the switch 169 is not actuated to closed position.

Figure 8:
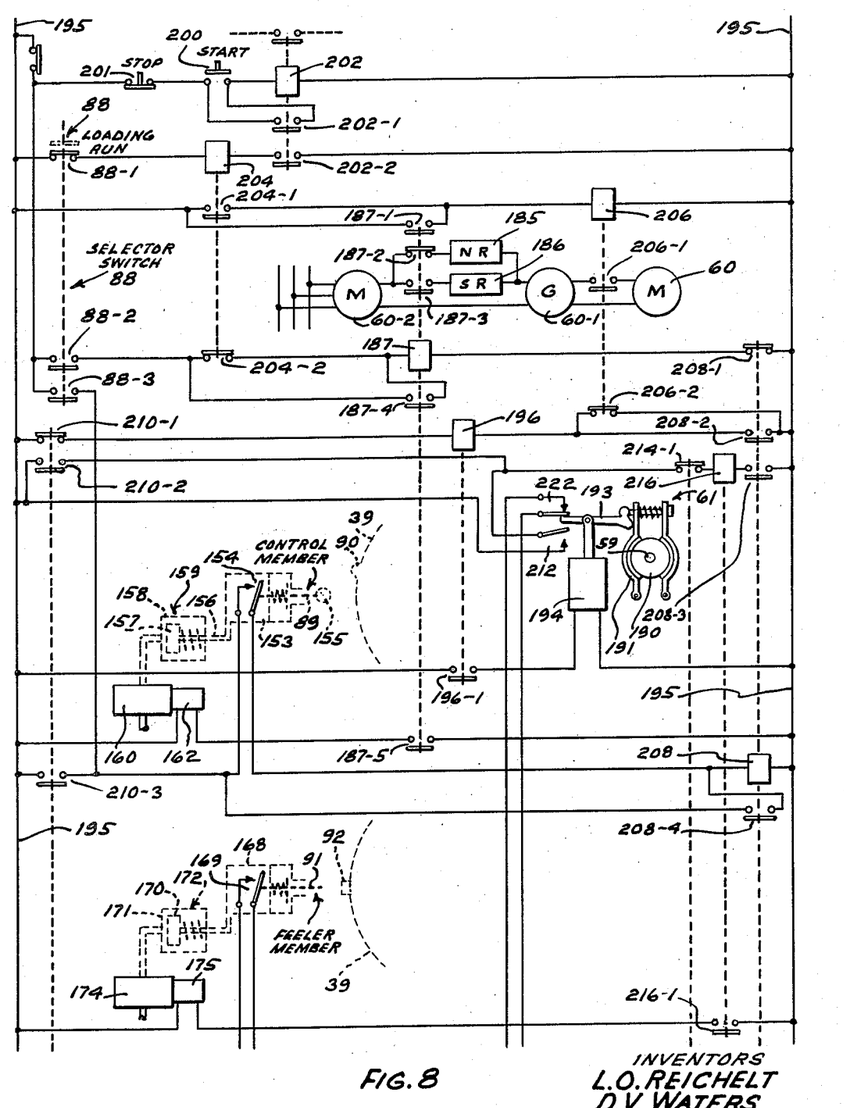
Figs. 8 and 8a comprise a diagrammatic view of the electrical control for the apparatus.
Figure 8A:
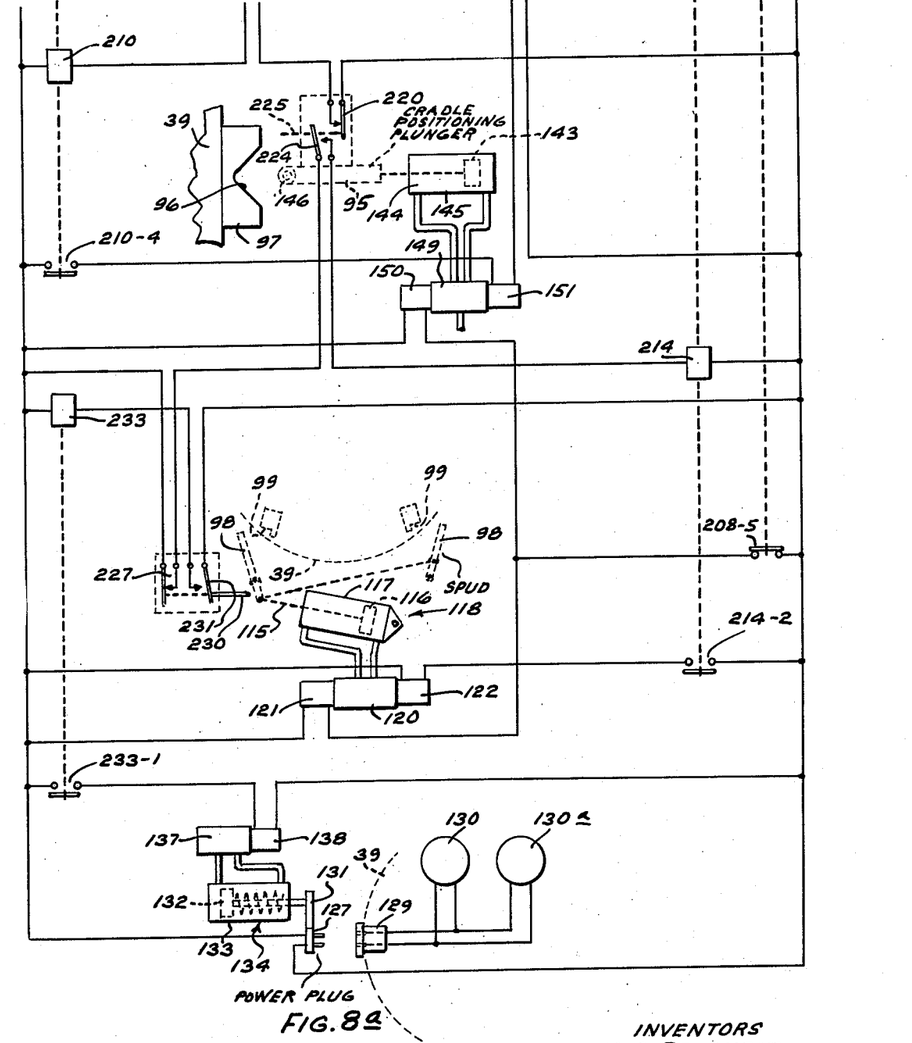

In Figs. 8 and 8a, there is shown diagrammatically a control system for effecting the sequential operation of the several components of the apparatus. The cradle-drive motor 60 is a variable D.C. motor of a conventional Ward Leonard variable speed drive system having a D.C. generator 60–1 driven by an alternating current motor 60–2 connected to a suitable power source. The speed of the motor 60 is controlled by varying the field of the generator 60–1 and this is accomplished by variable resistors which are indicated diagrammatically at 185 and 186 and are selectively cut into and out of the circuit through contacts 187–2, 187–3 of a slow-run relay 187.

The brake 61 for stopping the rotation of the drive shaft 59 and the cradle 39 comprises a brake drum 190 on the drive shaft 59 and a pair of pivoted brake shoes 191 which are spring urged to normal "released" position and are moved to "on" position by a lever 193 which in turn is actuated by a suitable power-operated device represented as a solenoid 194. This solenoid is connected to suitable power lines 195 in series with contacts 196–1 of a brake relay 196.

To initiate the operation of the apparatus, a start push button 200 (Fig. 8) which is connected to the power lines 195 in series with a stop button 201 and a start relay 202, is manually closed and effects the energization of the relay and the closing of its relay contacts 202–1 and 202–2. The closing of contacts 202–1 seals in the relay 202, is manually closed and effects the energization power lines 195 in series with a run relay 204 and contacts 88–1 of the selector switch 88 which also has contacts 88–2 and 88–3. The selector switch 88 is adapted to be manually set to "run" position indicated in full lines in Fig. 8 in which the contacts 88–1 are closed and the other contacts are opened, and to "loading" position indicated in dotted lines in which the contacts 88–1 are opened and the other contacts 88–2 and 88–3 are closed.

With the selector switch 88 in "run" position and the contacts 202–2 closed, the run relay 204 is energized to close its normally open contacts 204–1 and open its normally closed contacts 204–2. With the closing of contacts 204–1, a motor-control relay 206 is energized to close its normally open contacts 206–1 and thereby effect the operation of the motor 60 and the rotation of the cradle 39 at a normal operating speed. Simultaneously therewith, the reel-winding motor 87 (Figs. 1 and 2) and other components of the apparatus are actuated by control means including other contacts under control of the start relay 202 to effect the operation of the cable-stranding apparatus and the formation of the cable 36 as disclosed in co-pending application Serial No. 826,153, filed July 10, 1959. After a predetermined length of the cable has been formed, the apparatus is stopped either by the manual actuation of the stop switch 201 or by automatic means not shown. The components of the control circuit are then in the positions shown in Figs. 8 and 8a.

As previously stated, when the apparatus is stopped, the cradle 39 may come to rest at any angular position about the axis 38 thereof and it is then necessary to reposition the cradle to its "loading" position with the reel 40 disposed vertically (Fig. 2) to permit the unloading of the full reel of cable.

To accomplish this, the operator manually shifts the selector switch from "run" position to "loading" position, thereby opening contacts 88–1 and closing contacts 88–2 and 88–3. With the closing of contacts 88–2, a circuit is completed through the normally closed contacts 204–2, the slow-run relay 187 and contacts 208–1 of a relay 208, thereby energizing the slow-run relay 187 and closing the relay contacts 187–3 and opening contacts 187–2 to condition the cradle-drive motor circuit for slow running. The energization of the slow-run relay 187 also closes contacts 187–4 to seal in the relay and closes normally open contacts 187–5, and in addition thereto, it closes contacts 187–1 to effect the energization of the motor-control relay 206 and the rotation of the cradle motor 60 at a slow speed and the rotation of the cradle 39 at approximately 1½ revolutions per minute.

With the closing of the contacts 187–5 of the slow-run relay 187, a circuit is completed through the solenoid 162 to effect the energization of the solenoid 162 and the shifting of the valve 160 to admit compressed air into the cylinder 158 of the fluid-operated actuator 159 which thereby moves the carrier 153 to its advanced position with the roller 155 of the control member 89 in the path of the cam 90 on the cradle 39. When the cradle and reel 40 reach a predetermined angular position, the cam 90 will actuate the control member 89 and cause it to close the switch 154 thereby completing a circuit from the power lines 195 through the switch contacts 88–3, switch 154 on the carrier 153 and the relay 208.

This results in the energization of the relay 208 and the opening of its normally closed contacts 208–1 and 208–5 and the closing of its normally open contacts 208–2, 208–3, 208–4, the latter of which seals in the relay. As the contacts 208–1 open, the slow-run relay is deenergized and effects the deenergization of the valve-operating solenoid 162, the return of the carrier 153 to its normal retracted position and the opening of the switch 154. With the closing of contacts 208–2, a circuit is completed through the brake relay 196 and normally closed contacts 210–1 of a relay 210 thereby effecting the energization of the relay 196 and the closing of its contacts 196–1. The closing of the contacts 196–1 effects the energization of the brake solenoid 194 and the actuation of the brake 61 to stop the cradle in a position of "approach" with 7° of its final loading position and with the projecting abutment 92 disposed in the path of the feeler member 91.

When the brake 61 is fully set, the brake lever 193 closes a normally open switch 212 which completes a circuit from the power line 195 through contacts 214–1 of a relay 214, a time-delay relay 216 and the presently closed contacts 208–3 to effect the energization of the time-delay relay 216 and the closing of its contacts 216–1 after a predetermined time delay sufficient to insure that the brake 61 is fully set and that the cradle 39 has come to rest.

With the closing of the relay contacts 216–1, a circuit is completed from the power line to energize the valve-operating solenoid 175 to effect the shifting of the valve 174 and the admission of compressed air into the fluid-operated actuator 172. This effects the movement of the carrier 168 and the feeler member 91 toward the cradle, and if the cradle has been stopped in the position of "approach," the projecting abutment 92 will intercept the feeler member 91 and arrest its movement as the carrier 168 continues its movement to its advanced position, thereby effecting the closing of the feeler switch 169.

The closing of feeler switch 169 completes a circuit through a normally closed switch 220 and the relay 210 resulting in the energization of the relay and the closing of its normally open contacts 210–2, 210–3, 210–4, and the opening of its closed contacts 210–1. With the opening of the contacts 210–1, the brake relay 196 is deenergized, resulting in the deenergization of the brake solenoid 194 and the release of the brake 61. The relay contacts 210–2, which are in parallel with brake-operated switch 212, serve to lock in the time-delay relay 216 when the switch 212 opens.

As the brake 61 reaches its fully released position, the lever 193 closes a switch 222 which completes a circuit from the power line through the relay contacts 210–4 and the valve-operating solenoid 151 resulting in the energization of the solenoid and the shifting of the valve 149 to effect the operation of the fluid-operated actuator 145 and the forward movement of the cradle-positioning plunger 95. During the forward movement of the cradle-positioning plunger 95, the roller 146 thereon will engage an inclined cam surface of the centering recess 96 on the cradle 39 and ride into the bottom of the recess to turn the cradle and to stop it in its unloading position with the reel 40 disposed vertically.

Mounted on the positioning plunger 95 for movement therewith are the normally closed switch 220 and a normally open switch 224 which are engaged by an element 225 adapted to be actuated by the block 97 on the cradle 39 to effect the closing of the switch 224 and the opening of the switch 220 as the positioning plunger 95 is advanced into the bottom of the centering recess 96. With the opening of the switch 220, the relay 210 is deenergized resulting, in part, in the opening of relay contacts 210–4 and the deenergization of the valve-operating solenoid 151. The opening of contact 210–2 results in the deenergization of the time-delay relay 216, the opening of the relay contacts 216–1, the deenergization of the valve-operating solenoid 175 and the return of the feeler member 91 to its retracted position. With the closing of the switch 224 on the positioning plunger 95, a circuit is completed from the power lines through a normally closed switch 227 and the relay 214 resulting in the energization of the relay 214 and the closing of its normally open contact 214–2.

In response to the closing of contacts 214–2, the valve-operating solenoid 122 is energized to effect a shifting of the valve 120 and the operation of the fluid-operated actuator 118 to effect the movement of the spuds 98 from their normal inoperative positions to their operative positions in engagement with the abutments 99 on the cradle 39. As the spuds are moved into operative position to lock the cradle against rotation in either direction, the arm 110 on one of the spuds engages and moves an actuating member 230 to effect the opening of the normally closed switch 227 and the closing of a normally open switch 231 stationarily mounted on a suitable support.

When the switch 227 is opened, the relay 214 is deenergized resulting in the closing of its contacts 214–1 and the opening of its contacts 214–2 and the deenergization of the valve-operating solenoid 122. In response to closing of the switch 231, the relay 233 is energized resulting in the closing of its normally open contacts 233–1 and the energization of the valve-operating solenoid 138 in series therewith and the shifting of the valve 137 to open position. This effects the operation of the actuator 134 and the movement of the power plug 127 toward the cradle 39 and into engagement with the receptacle 129 to connect the power line 195 to the interior circuits within the cradle 39 for supplying power to the motors 130 and 130a.

As long as the selector switch 88 remains in its "loading" setting, a circuit will be completed through the relay 208, the relay contacts 208–4 and selector switch contacts 88–3 resulting in maintaining the relay 208 energized and the normally closed relay contacts 208–5 in open position.

When the reel and reel-truck unit 75 with the wound cable thereon has been removed from the cradle 39 and an empty reel and reel-truck unit 75 placed on the cradle and secured thereto and the end of the cable 36 being fabricated has been attached to the reel and the apparatus is in condition to be started, the selector switch 88 is manually moved from the "loading" setting to the "run" setting which closes the contacts 88–1 and opens contacts 88–2 and 88–3 of the selector switch. The opening of the contacts 88–3 results in the deenergization of the relay 208 and the closing of its contacts 208–5 which completes circuits causing the energization of the spud-lock solenoid 121 and the valve-operating solenoid 150 to effect the return movement of the spuds 98 and the positioning plunger 95 to their normal retracted positions as indicated in Fig. 8a.

In response to the retraction of the spuds 98 to their normal inoperative positions, the switches 227 and 231 are returned to their normally closed and open positions, respectively, and in response to the return of the positioning plunger 95 to its normal inoperative position, the switches 220 and 224 are restored to their normally closed and open positions, respectively. With the opening of the spud-operated switch 231, the relay 233 becomes deenergized and the contacts 233–1 thereof are opened resulting in the deenergization of the valve-actuating solenoid 138, the shifting of the valve 137 and the reverse operation of the actuator 134 to withdraw the power plug 127 from the receptacle 129 on the cradle and return it to its retracted position.

With the selector switch 88 in its "run" position, and upon actuation of the start button 200, the apparatus will again be started and the cradle drive motor 60 will operate to drive the cradle at its normal operating speed as previously described.

Referring again to the feeler member 91, the projecting abutment member 92, the V-shaped positioning recess 96 and the positioning plunger 95 of the cradle-positioning mechanism, it will be understood that the abutment member 92 is so proportioned and located on the cradle 39 that it will intercept the feeler member 91 and arrest its movement only when the centering recess 96 on the cradle is in alignment with the positioning plunger 95. Thus in response to the manual setting of the selector switch to "loading" position and the ensuing slow rotation of the cradle and the stopping of the cradle during the cradle-positioning operation, in the event that the cradle is stopped in a location other than said "approach" position and beyond said predetermined angular distance of approximately 7° from the loading position, the projecting abutment 92 will not intercept the feeler member 91 and will not arrest its forward movement and thereby the switch 169 will not be closed and the positioning plunger 95 will not be actuated to move the cradle to loading position. The operation of the control mechanism and the cradle-positioning mechanism will thereby be brought to a stop.

Under such circumstances, the operator may move the selector switch from "loading" position to "run" position and return it to "loading" position. This will effect the recycling of the cradle-positioning mechanism and sequentially cause the cradle 39 to again be rotated at a slow speed of 1½ r.p.m., the actuation of the control member 89 to its forward position and the actuation thereof by the cam 90 on the cradle 39, the actuation of the brake 61 and the stopping of the cradle in "approach" position, the forward movement of the feeler member 91 and the actuation thereof by the projecting abutment member 92 on the cradle if the cradle 39 has stopped in its position of "approach," the forward actuation of the positioning plunger 95 into the positioning recess 96 to accurately locate the cradle in loading position, the actuation of the spuds 98 into engagement with the abutments 99 to lock the cradle against rotation and the movement of the power plug 127 into engagement with the receptacle 129 to connect the external source of power to the internal circuits within the cradle.

Figure 9:
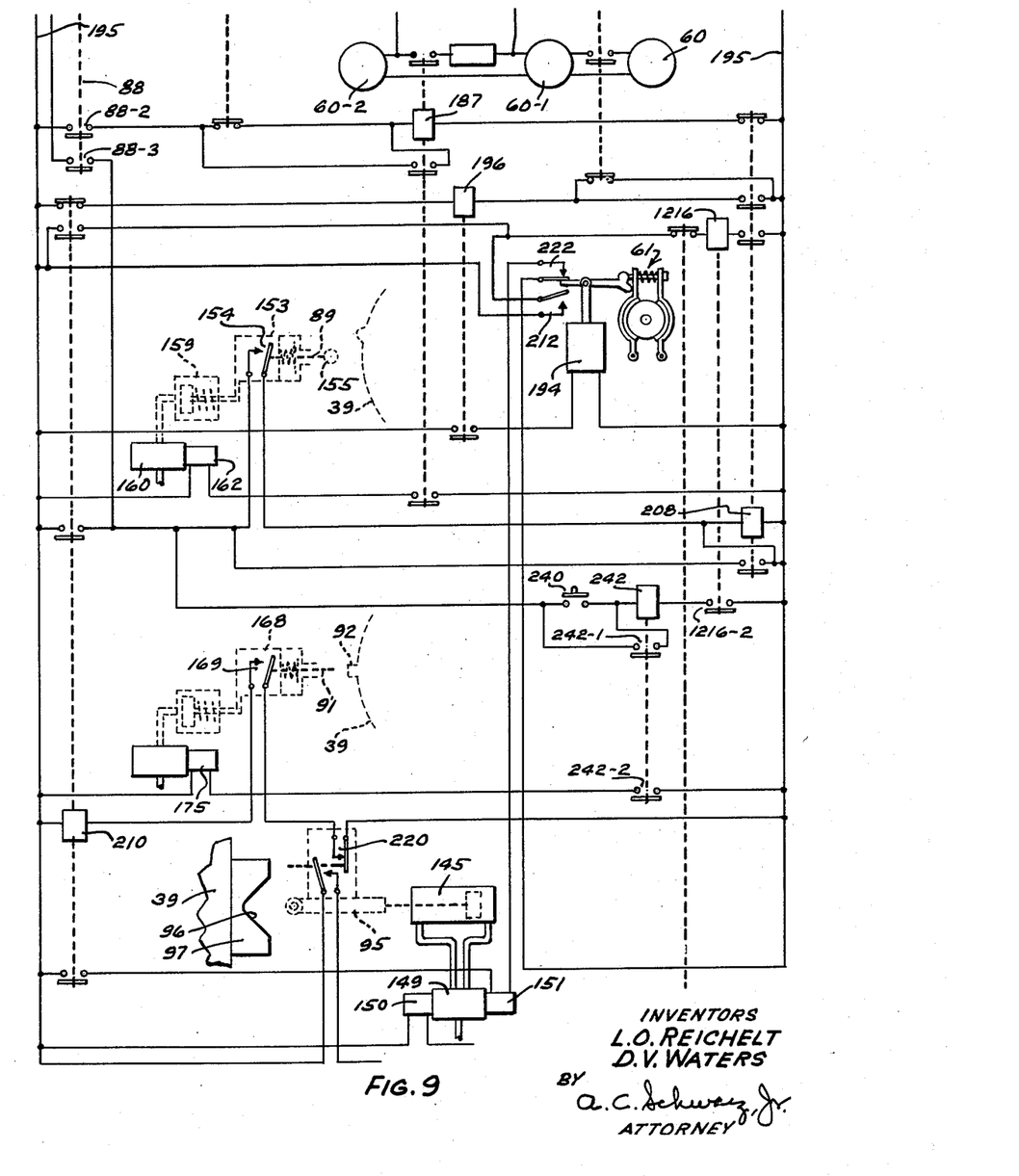
Fig. 9 is a fragmentary diagrammatic view similar to Figs. 8 and 8a showing a modified embodiment of the control circuit.

The modified embodiment of the control system shown in Fig. 9 distinguishes from the control system shown in Figs. 8 and 8a in that with the modified embodiment of the control system, after the selector switch 88 has been set to "loading" position, the cradle 39 is rotated at a slow speed of 1½ r.p.m., the control member 89 is moved from its retracted position to its forward position to place the roller 155 in the path of the cam 90 which actuates the control member 89 and effects the actuation of the brake 61 and the stopping of the cradle in its position of "approach" at which point the control system ceases to function. It is then necessary to manually close a push button 240 to complete the remainder of the operation for effecting the movement of the cradle from the position of "approach" to its final loading position.

Referring to Fig. 9, the time-delay relay 1216 corresponding to relay 216 in Fig. 8, has contacts 1216–2 which do not control the energization of the feeler solenoid 175 directly as in the preferred embodiment but which are connected in series with a relay 242, the normally open push button 240, and the contacts 88–3 of the selector switch 88. The relay 242 has normally open contacts 242–1 and 242–2 which are actuated to closed position in response to the momentary closing of the push button 240 and the energization of the relay 242. The contacts 242–1 serve to seal in the relay 242 and the contacts 242–2 are in series with the feeler solenoid 175. Thus when the push button 240 has been pressed and the contacts 242–2 are closed, the solenoid 175 is energized to effect the movement of the carriage 168 and the feeler 91 to its forward position and to render the control circuit effective to complete the remainder of the operation of moving the cradle from its position of "approach" to its loading position in the same manner as previously described in connection with the preferred embodiment of the control system.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In a cable-stranding apparatus, a cradle for supporting a cable take-up reel, selectively operable drive means operable under one condition for rotating said cradle at a normal operating speed and operable under a second condition for rotating said cradle at a reduced speed, brake means for stopping said cradle, means rendered effective in response to operation of said drive means under said second condition for actuation by said cradle when said cradle has reached a predetermined position to effect the actuation of said brake means to stop said cradle in a position of approach within a limited angular distance of a predetermined loading position, sensing means operable in response to actuation of said brake means for cooperation with and actuation by said cradle only when said cradle is in said position of approach, and positioning means operable in response to the actuation of said sensing means for moving said cradle from said position of approach to said loading position.

2. In a cable-forming apparatus, a cradle, drive means for rotating the cradle, control means for said drive means including a selector switch settable to a first position for effecting the rotation of said cradle at a normal operating speed and settable to a second position for effecting the rotation of said cradle at a reduced speed, a control member, means operable in response to the movement of said selector switch to said second position for moving said control member to an advanced position for actuation by said cradle when said cradle reaches a predetermined position, means operable in response to the actuation of said control member for stopping said cradle in a position of approach within a limited angular distance of a predetermined loading position, a feeler member, means for moving said feeler member toward said cradle for actuation thereby only when said cradle has been stopped in said position of approach, and means operable in response to actuation of said feeler member for turning said cradle from said position of approach to said loading position.

3. In an apparatus for forming cable, a base, a cradle rotatably mounted on said base and having a centering recess, drive means for rotating said cradle, control means for said drive means including a selector switch settable to a first position for effecting the rotation of said cradle at a normal operating speed and settable at a second position for effecting the rotation of said cradle at a reduced speed, brake means for stopping said cradle, a control member, means operable in response to movement of said selector switch to said second position for moving said control member from a normal retracted position to an advanced position for actuation by said cradle when the cradle reaches a predetermined position, means operable in response to actuation of said control member for actuating said brake means to stop said cradle in a position of approach within a limited angular distance of a predetermined loading position, a feeler member, means for moving said feeler member from a normal retracted position to an advanced position for actuation by said cradle only when said cradle has been stopped in said position of approach, a positioning plunger mounted on said base for movement into said centering recess to turn said cradle from said approach position to said loading position, and means operable in response to the actuation of said feeler member for actuating said plunger.

4. In an apparatus for forming cable, a base, a cradle rotatably mounted on said base and having a V-shaped recess, drive means for rotating said cradle, control means for said drive means including a selector switch settable to a first position for effecting the rotation of said cradle at a normal operating speed and settable at a second position for effecting the rotation of said cradle at a reduced speed, a control member, means operable in response to movement of said selector switch to said second position for moving said control member toward said cradle to a predetermined advanced position, means on said cradle for actuating said control member when the cradle reaches a predetermined position, means operable in response to actuation of said control member for stopping said cradle in a position of approach within a limited angular distance of a predetermined loading position, a feeler member, means for moving said feeler member toward said cradle, means on said cradle for intercepting and actuating said feeler member only when said cradle has been stopped in said position of approach, a positioning plunger mounted on said base for movement into said V-shaped recess on said cradle, and means operable in response to the actuation of said feeler member for actuating said plunger to turn said cradle from said approach position to said loading position.

5. In an apparatus for forming cable, a base, a cradle rotatably mounted on said base and having a positioning recess, drive means for rotating said cradle, control means for said drive means including a selector switch settable to a first position for effecting the rotation of said cradle at a normal operating speed and settable at a second position for effecting the rotation of said cradle at a reduced speed, a brake for stopping said cradle, a control member, means operable in response to movement of said selector switch to said second position for moving said control member along a fixed path, means on said cradle for actuating said control member when the cradle reaches a predetermined position, means operable in response to actuation of said control member for actuating said brake to stop said cradle in a position of approach within a limited angular distance of a predetermined loading position, a feeler member, means operable in response to the actuation of said brake for moving said feeler member along a fixed path toward said cradle, means on said cradle for intercepting and actuating said feeler member only when said cradle has been stopped in said position of approach, a positioning plunger mounted on said base for movement into said positioning recess, and means operable in response to the actuation of said feeler member for actuating said plunger to effect the turning of said cradle from said approach position to said loading position.

6. In a cable-stranding apparatus, a base, a cradle rotatably mounted on said base and having a V-shaped recess, drive means for rotating the cradle, brake means for stopping the rotation of the cradle, selective control means for said drive means operable in a first position for effecting the rotation of the cradle at a normal operating speed and operable in a second position for effecting the rotation of the cradle at a reduced speed, a cam mounted on said cradle, a first switch, a first actuator mounted on said base and operable in response to the movement of said control means to said second position for moving said first switch to an operative position in the path of said cam for actuation thereby, means controlled by the actuation of said first switch for operating said brake means to stop the cradle in a position of an approach within a limited angular distance of predetermined loading position, a feeler switch, a second actuator mounted on said base and operable in response to actuation of said brake means for moving said feeler switch along a fixed path toward said cradle, means on said cradle for arresting the movement of and actuating said feeler switch only when said cradle has been stopped in said approach position, a plunger, and means on said base responsive to the actuation of said feeler switch for actuating the plunger into said V-shaped recess to effect the movement of the cradle from said approach position to said loading position.

7. In a cable-forming apparatus, a base, a cradle mounted on said base for rotation about a substantially horizontal axis for supporting a cable take-up reel and having a pair of side openings permitting the loading of a reel thereon from either side of the cradle, means for rotating the cradle, means for stopping the cradle at a predetermined loading position, a pair of downwardly directed shoulders on said cradle, a pair of arms mounted on said base for movement from normal inoperative positions disengaged from said cradle to operative upright positions in engagement with said shoulders for locking said cradle against rotary movement, said shoulders on said cradle and said arms being disposed on opposite sides of a vertical plane through the axis of the cradle, and means for automatically actuating said arms to said operative position after said cradle has stopped in said loading position.

8. In a cable-forming apparatus, a base, a cradle mounted on said base for rotation about a substantially horizontal axis for supporting a cable take-up reel and having a pair of side openings permitting the loading of a reel thereon from either side of the cradle, a pair of abutments on said cradle, a pair of arms each having an end portion provided with a cylindrical surface, supports on said base on opposite sides of a vertical plane through the axis of the cradle having recesses with concave cylindrical surfaces conforming to and engageable with the cylindrical end portions of said arms for supporting the arms for oscillatable movement about axes concentric with said cylindrical surfaces from inoperative positions disengaged from said abutments to operative positions with said arms directed upwardly in engagement with said abutments for locking said cradle against rotation in opposite directions, said arms having apertures therethrough in alignment with said axes, pivot pins on said supports extending through and of smaller diameters than said apertures in said arms for loosely retaining the arms on said supports, and means for simultaneously moving said arms to and from said operative and inoperative positions.

9. In a cable-forming apparatus, a base, a cradle mounted on said base for rotation about a substantially horizontal axis for supporting a cable take-up reel thereon and having a pair of side openings permitting the loading of a reel thereon from either side of the cradle, a pair of abutments on said cradle, a pair of arms each having an end engageable with an abutment and having an end provided with a cylindrical surface, brackets on said base disposed on opposite sides of a vertical plane through the axis of the cradle and having recesses with cylindrical surfaces conforming to and engaging the cylindrical ends of said arms for supporting the arms for oscillatable movement about axes concentric with said cylindrical surfaces, said arms having apertures therethrough in alignment with said axes, pins on said brackets of smaller diameter than said apertures and extending through said apertures in concentric relation thereto for loosely retaining the arms in said brackets, a pair of levers pivotally mounted on said pins and having upper end portions with lateral projections straddling said arms for imparting pivotal movement thereto about said axes in response to actuation of said levers, and means for simultaneously actuating said levers to move said arms from inoperative positions disengaged from said abutments to operative positions in engagement therewith for supporting the cradle against rotation in opposite directions.

10. In a cable-stranding apparatus, a base, a cradle rotatably mounted on said base for supporting components of the apparatus including an electrically operated mechanism, a first connector element mounted on said cradle and electrically connected to said electrically operated mechanism, a second connector element electrically connected to an external source of power, means on said base for mounting said second electrical connector element in a predetermined position adjacent said cradle, variable drive means for rotating said cradle, control means for said drive means including a selector switch settable to one position for effecting the rotation of said cradle at a reduced speed, a first switch, means on said base operable in response to the movement of said selector switch to said one position for moving said first switch to an advanced position, means on said cradle for actuating said first switch when the cradle reaches a predetermined position, brake means for stopping said cradle, means responsive to the actuation of said first switch for effecting the actuation of said brake means to stop the cradle in a position of approach within a limited angular distance of a predetermined loading position, a feeler switch, means operable in response to the actuation of said brake means for advancing said feeler switch toward the cradle, an element on the cradle for arresting the movement of and actuating said feeler switch only when the cradle has been stopped in said approach position, said cradle having a centering recess, a positioning plunger mounted on said base for movement into said centering recess on said cradle when said cradle is in said position of approach, means operable in response to the actuation of said feeler switch for actuating said plunger to effect the movement of said cradle from said approach position to said loading position to align the electrical connecting elements with one another, means for actuating said second connector element into engagement with said first connector element to supply power to the electrically operated mechanism on said cradle, and control means for effecting the operation of said last-mentioned actuating means in timed relation to the movement of said cradle to said loading position.

11. In a cable-forming apparatus, a base, a cradle provided with a centering recess and mounted on said base for rotation about a horizontal axis for supporting components of the apparatus including a cable take-up reel and an electrically operated mechanism for clamping said reel to the cradle, said cradle having a pair of side openings for permitting loading of the reel onto the cradle from either side and having a pair of spaced shoulders, a pair of arms pivotally mounted on said base on opposite sides of a vertical plane through said axis for movement to an operative position disposed upright in engagement with said shoulders on said cradle for locking the cradle against rotation in opposite directions, an electrical socket element mounted on said cradle and electrically connected to said electrically operated mechanism, a power plug electrically connected to an external source of electrical power, means on said base for mounting said power plug in a predetermined position adjacent said cradle, variable drive means for rotating said cradle, control means for said drive means including a selector switch settable to a first position for effecting the rotation of said cradle at a normal operating speed and settable to a second position for effecting the rotation of said cradle at a reduced speed, a control member, means on said base rendered effective when said selector switch is in said second position for moving said control member to an advanced position, means on said cradle for actuating said control member when the cradle reaches a predetermined position, brake means for stopping said cradle, means responsive to the actuation of said control member for effecting the operation of said brake means to stop the cradle in a position of approach within a limited angular distance of a predetermined loading position, a feeler member, means operable in response to the actuation of said brake means for advancing said feeler member toward said cradle, means on said cradle for arresting the movement of and effecting the actuation of said feeler member only when the cradle has been stopped in said approach position, a cradle positioning plunger mounted on said base for movement into said centering recess on said cradle when said cradle is in said approach position, means operable in response to the actuation of said feeler member for actuating said plunger to effect the movement of said cradle from said approach position to said loading position to align said electrical socket element with said power plug, means operable in response to the actuation of said positioning plunger for effecting the actuation of said arms to operative position, and means operable in response to movement of said arms to operative position for moving said power plug into engagement with said electrical socket element.

12. In a cable-forming apparatus, a cradle, drive means for rotating the cradle, control means for said drive means including a selector switch settable to a first position for effecting the rotation of said cradle at a normal operating speed and settable to a second position for effecting the rotation of said cradle at a reduced speed, a control member, means operable in response to the movement of said selector switch to said second position for moving said control member to an advanced position for actuation by said cradle when said cradle reaches a predetermined position, means operable in response to the actuation of said control member for stopping said cradle in a position of approach within a limited angular distance of a predetermined loading position, a feeler member, a manually operable switch, means responsive to the actuation of said manually operable switch for moving said feeler member toward said cradle for actuation thereby only when said cradle has been stopped in said position of approach, and means operable in response to actuation of said feeler member for turning said cradle from said position of approach to said loading position.

13. In a cable stranding apparatus, a base, a cradle rotatably mounted on said base for supporting a cable take-up reel and an electrically operated mechanism, a first connector element mounted on said cradle and electrically connected to said electrically operated mechanism, a second connector element electrically connected to an external source of power, selectively operable drive means effective under one condition for rotating said cradle at a normal operating speed and effective under a second condition for rotating said cradle at a reduced speed, brake means for stopping said cradle, means rendered effective in response to operation of said drive means under said second condition for actuation by said cradle when the cradle has reached a predetermined position to effect the actuation of said brake means to stop said cradle in a position of approach within a limited angular distance of a predetermined loading position, sensing means operable in response to actuation of said brake means for cooperation with and actuation by said cradle when said cradle is in said position of approach, positioning means operable in response to the actuation of said sensing means for moving said cradle from said position of approach to said loading position, means on said base for mounting said second electrical connector element in a predetermined position adjacent and in alignment with said first connector element when said cradle is in said loading position, and means operable after the movement of said cradle to said loading position for moving said second connector element into engagement with said first connector element.

14. In a cable forming apparatus, a base, a cradle mounted on said base for rotation about a substantially horizontal axis for supporting a cable take-up reel and an electrically operated mechanism and having a pair of side openings permitting the loading of a reel thereon from either side of the cradle, a first connector element mounted on said cradle and electrically connectible to said electrically operated mechanism, means for rotating the cradle, means for stopping the cradle at a predetermined loading position, a second connector element electrically connected to an external source of power, means on said base for mounting said second connector element adjacent said first connector element when said cradle is in said loading position, a pair of downwardly directed shoulders on said cradle, a pair of arms pivotally mounted on said base for movement from normal inoperative positions disengaged from said cradle to operative upright positions in engagement with said shoulders for locking said cradle against rotary movement, said shoulders on said cradle and said arms being disposed on opposite sides of a vertical plane through the axis of the cradle, means responsive to the stopping of the cradle in said loading position for actuating the arms to said operative position, and means responsive to the movement of the arms to said operative position for moving said second connector element into engagement with said first connector element.

References Cited in the file of this patent

UNITED STATES PATENTS

| | | |
|---|---|---|
| 1,636,466 | Edwards et al. | July 19, 1927 |
| 2,366,145 | Larmuth | Dec. 26, 1944 |
| 2,454,329 | Merwin et al. | Nov. 23, 1948 |

UNITED STATES PATENT OFFICE

CERTIFICATION OF CORRECTION

Patent No. 2,958,994 November 8, 1960

Lester O. Reichelt et al.

It is hereby certified that error appears in the above numbered patent requiring correction and that the said Letters Patent should read as corrected below.

Column 2, line 22, for "cradle-postioning" read -- cradle-positioning --; column 6, line 4, strike out ", is manually closed and effects the energization" and insert instead -- . The contacts 202-2 are connected across the --; column 7, line 11, for "with", first occurrence, read -- within --.

Signed and sealed this 25th day of April 1961.

(SEAL)
Attest:

ERNEST W. SWIDER
Attesting Officer

DAVID L. LADD
Commissioner of Patents